(12) United States Patent
Hashimoto et al.

(10) Patent No.: US 8,935,530 B2
(45) Date of Patent: Jan. 13, 2015

(54) CONTROL DEVICE AND COMPUTER READABLE MEDIUM

(75) Inventors: Mikio Hashimoto, Tokyo (JP); Shinji Yamanaka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 219 days.

(21) Appl. No.: 13/534,373

(22) Filed: Jun. 27, 2012

(65) Prior Publication Data

US 2013/0073851 A1    Mar. 21, 2013

(30) Foreign Application Priority Data

Sep. 21, 2011   (JP) ................................ 2011-206151

(51) Int. Cl.
*H04L 9/32* (2006.01)
*H04W 12/12* (2009.01)

(52) U.S. Cl.
CPC ............. *H04W 12/12* (2013.01); *H04L 9/3247* (2013.01); *H04L 2209/80* (2013.01)
USPC ........................................................ 713/168

(58) Field of Classification Search
None
See application file for complete search history.

(56) References Cited

U.S. PATENT DOCUMENTS

2009/0319782 A1* 12/2009 Lee ................................ 713/156

FOREIGN PATENT DOCUMENTS

JP        3233274        9/2001

OTHER PUBLICATIONS

Japanese Office Action for Japanese Application No. 2011-206151 mailed Jan. 21, 2014, 4 pages.

* cited by examiner

*Primary Examiner* — Brandon Hoffman
(74) *Attorney, Agent, or Firm* — Amin, Turocy & Watson, LLP

(57) ABSTRACT

A control device includes: a random number generating unit that generates a random number; a first setting unit that sets the random number in a first storage; a message creating unit that encrypts the random number using a public key of the administrative server and to create a request message to be transmitted to the administrative server; a timer starting unit that starts a timer; an activation unit that activates the system software; a timer canceling unit that accepts an interruption from the system software and cancels the timer; a message verifying unit that verifies the notification message from the administrative server using the public key and the random number; and a restart unit that restarts the system software while limiting the functions, in the case where the timer expires time or the verification fails.

12 Claims, 11 Drawing Sheets

US 8,935,530 B2

CONTROL DEVICE AND COMPUTER READABLE MEDIUM

CROSS REFERENCE TO RELATED APPLICATIONS

This application is based upon and claims the benefit of priority from the prior Japanese Patent Application No. 2011-206151, filed on Sep. 21, 2011, the entire contents of which are incorporated herein by reference.

FIELD

Embodiments relate to a control device and a computer-readable medium.

BACKGROUND

Software vulnerability is a major risk factor associated with today's cyber attacks.

The software vulnerability is a major problem in typical networks. This would especially be so in a network including a large number of homogeneous terminal devices, for instance, in a control network with a high proportion of devices having same defects. Moreover, breakdown of such a control network poses more serious threats in that the functions of social infrastructures, such as transmission and distribution of electricity, traffic systems and production facilities, would be lost.

As to security of the control network, in addition to data confidentiality and integrity that are required in view of billing and privacy information protection, availability and reliability are strongly demanded. The former (confidentiality) is achieved by applying end-to-end security, such as SSL. The latter (integrity) is achieved by applying techniques of isolation from a general network, such as wireless LAN security and a virtual private network (VPN).

Conventionally, a control network has been physically isolated so as to avoid adverse effects of traffic or attacks from another terminal, in particular an unauthorized terminal. In power distribution networks and sensor networks, a part of its public network is increasingly configured as a virtual private network (VPN) to exclude connection from an unauthorized terminal. In addition to such isolation, a basic practice for control network security is to concurrently use end-to-end security, such as SSL, which is common in a public network.

In both of such isolation and end-to-end security, the core of supporting a cryptographic process and access control for implementation thereof is system software (and partially, cryptographic hardware).

The software vulnerability becomes a large problem when the system software is targeted for falsification. Falsified system software leads to the impairment of not only applicational functions, such as data collection and control procedures, but also both the function related to the confidentiality and the isolation function.

If a terminal in the control network is intruded owing to software vulnerability, the same cryptographic process and access control functions of the system software may be impaired for both the isolation (e.g., an authentication process of wireless LAN security) and the end-to-end security (e.g., an authentication process for billing application). This may further lead to leakage of a secret key.

System software update is essential for correction (prevention and recovery) of software vulnerability. However, such system software update is generally intended for prevention, and the system software which is normally operating is prerequisite. A large-scale intrusion into the network will be addressed by a network administrator who partially isolates the network or other operations, and eventually software of each device will manually be updated through a maintenance interface of the device, and not through the network. This, however, requires many field service engineers, and is costly.

DETAILED DESCRIPTION

Figure 1:
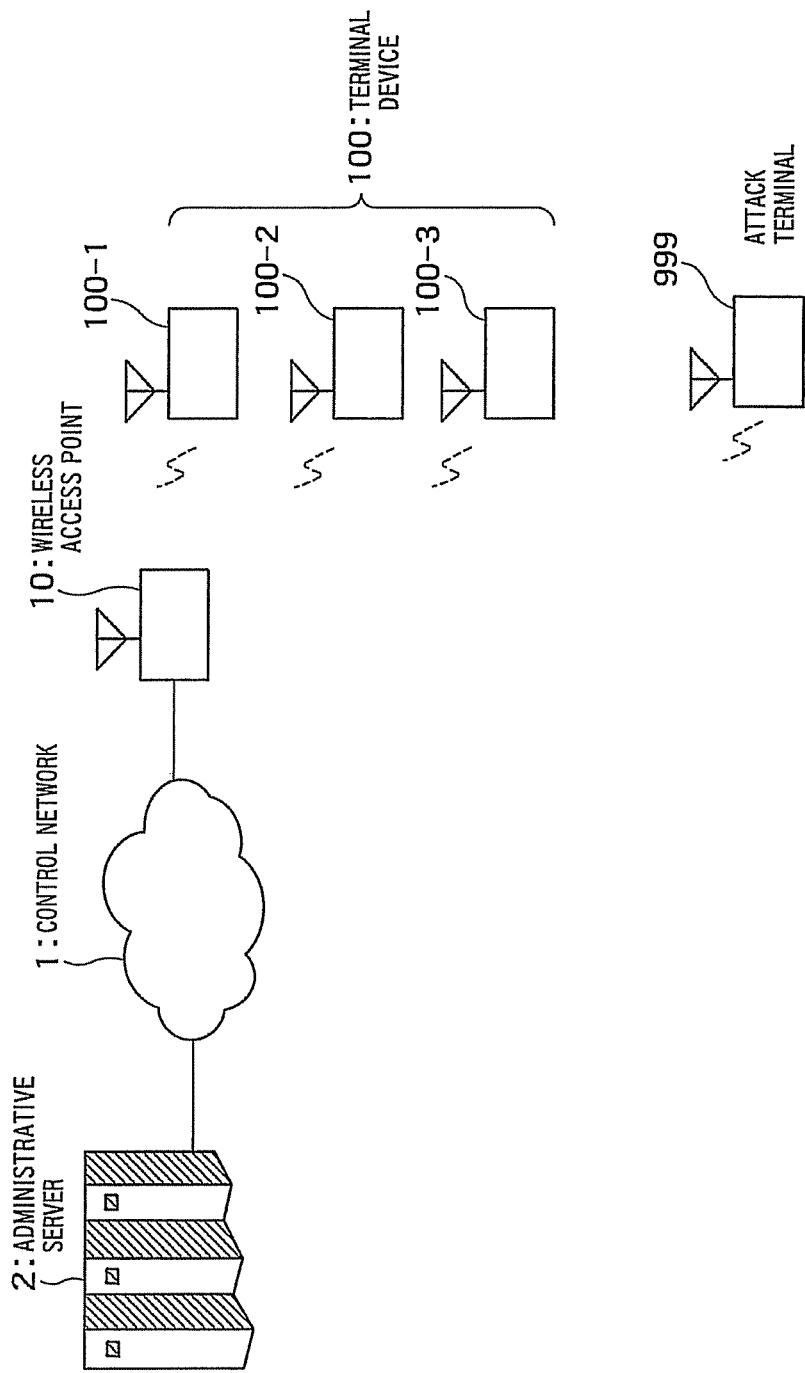
FIG. 1 is a diagram showing a configuration of a network according to an embodiment.

According to an embodiment, there is provided a control device communicating with an administrative server by using system software. The system software includes a first function and a second function. The first function performs message transmission and reception to and from the administrative server. The second function provides a network service different from the message transmission and reception for an external device. The external device is identical to or different from the administrative server.

The control device includes a monitor program storage, an execution unit, a first storage, a second storage, a third storage, a timer, a random number generating unit, a first setting unit, a message creating unit, a second setting unit, a timer starting unit, a system software starting unit, an interruption accepting unit, a timer canceling unit, a message verifying unit and a restart unit.

The monitor program storage stores a monitor program inaccessible from the system software.

The execution unit reads and executes the monitor program.

The first storage is accessible from the monitor program but inaccessible from the system software.

The second storage is accessible from both the monitor program and the system software.

The third storage is accessible from both the monitor program and the system software.

The timer is capable of being set by the monitor program and incapable of being set by the system software.

The random number generating unit generates a random number.

The first setting unit sets the random number generated by the random number generating unit in the first storage, by the monitor program being executed.

The message creating unit encrypts the random number in the first storage using a public key of the administrative server and creates a request message that is to be transmitted to the administrative server, by the monitor program being executed.

The second setting unit sets the request message in the second storage, by the monitor program being executed.

The timer starting unit designates a time and to start the timer, by the monitor program being executed.

The system software starting unit starts the system software in a first operation mode in which both the first function and the second function can be executed, by the monitor program being executed.

The interruption accepting unit accepts an interruption from the system software being executed, to the monitor program.

The timer canceling unit cancels the timer, by the monitor program being executed in response to the interruption.

The message verifying unit reads, from the third storage, a notification message that is a response to the request message from the administrative server, and verifies the notification message on the basis of the public key and the random number in the first storage, by the monitor program being executed in response to the interruption.

The restart unit restarts the system software in a second operation mode capable in which the first function can be executed but the second function cannot be executed, by the monitor program being executed, in a case where the timer expires before cancellation by the timer canceling unit, or in a case where verification by the message verifying unit fails.

Hereinafter, first, a technical background of this embodiment will be described.

There has been a method that detects malware by malware detecting software of a terminal device, notifies an administrative server, pushes update software from the administrative server, and the terminal device receives the software. However, the notification and reception are typically performed via system software (a set of an OS (operating system) and applications). Accordingly, in the state where the OS is infected with malware, there are threats of obstruction to notification, reception, and application of received update software at each stage. The malware is detected by a pattern matching process. Accordingly, the process imposes a heavy load, and does not appropriately function without receiving latest pattern information. As to acquisition of the latest pattern information, threats are assumed that malware performs obstruction by combining an unauthorized operation on the system time and reception obstruction.

On the other hand, a configuration may be adopted in which a monitor system that operates on a dedicated monitor processor and has a communication function independent from a main system supports measures against malware. This case has a low threat according to which a series of operations including detection and notification of malware, reception of update software and latest pattern information by the monitor system cannot be obstructed by the malware on the main system. However, since this configuration requires a dedicated processor, the cost is high. Furthermore, the monitor system includes a communication function independent from the main system. There is a possibility that this communication function itself includes vulnerability. The communication function is most likely to have vulnerabilities. Thus, there is a chicken and egg problem in terms of an object to improve security of the main system by adding the monitor system.

Furthermore, in a situation where update software with its vulnerability corrected has not been distributed yet, or a situation where, even though the update software has been distributed, it is difficult to acquire the update software owing to obstruction by the malware or network/server congestion, it is required to take measures that prevent further malware infection to the own device and communication obstruction by the malware infected to the own device.

The embodiment of the present invention, which assumes a possibility that the OS is infected with malware, adopts procedures in which a ROM (read only memory) monitor program with no communication function exchanges limited information with a server and autonomously performs an operation of updating the system software on the basis of the situation. This can detect obstructive actions to be assumed if the OS mediating communication is infected with malware, without the need of an dedicated monitor processor, at low load (without the need of a detecting process having a heavy load, such as pattern matching on memory data), thereby allowing measures against vulnerability.

More specifically, the embodiment of the present invention enables a single microcomputer having a simple watch dog timer circuit, a nonvolatile memory and an access control function to autonomously recover from large-scale infection caused by malware. In particular, the autonomous recovery is characterized by the use of communication with the server for verifying the malware infection and software update status of the control device. This feature assures a proper application of updated system software to the control device within a prescribed period, even if a malware infected on the device disturbs reception of update notification and/or communication itself. This embodiment avoid performing a process of detecting malware on the terminal device, such as a pattern matching process on memory, which imposes significant load on the system.

Hereinafter, referring to drawings, the embodiment of the present invention will be described in detail.

FIG. 1 shows a network configuration according to this embodiment.

This network configuration includes a control network 1, an administrative server 2, a wireless access point 10 and terminal devices (control devices) 101-1 to 101-3. The control network 1 is wiredly connected to the administrative server 2 and the wireless access point 10.

The terminal devices 101-1 to 101-3 are connected to the wireless access point 10 via a wireless link. The control network 1 is a network using the Internet protocol. In addition to the above configuration, FIG. 1 shows an attack terminal 999 that attacks this network configuration.

Figure 2:
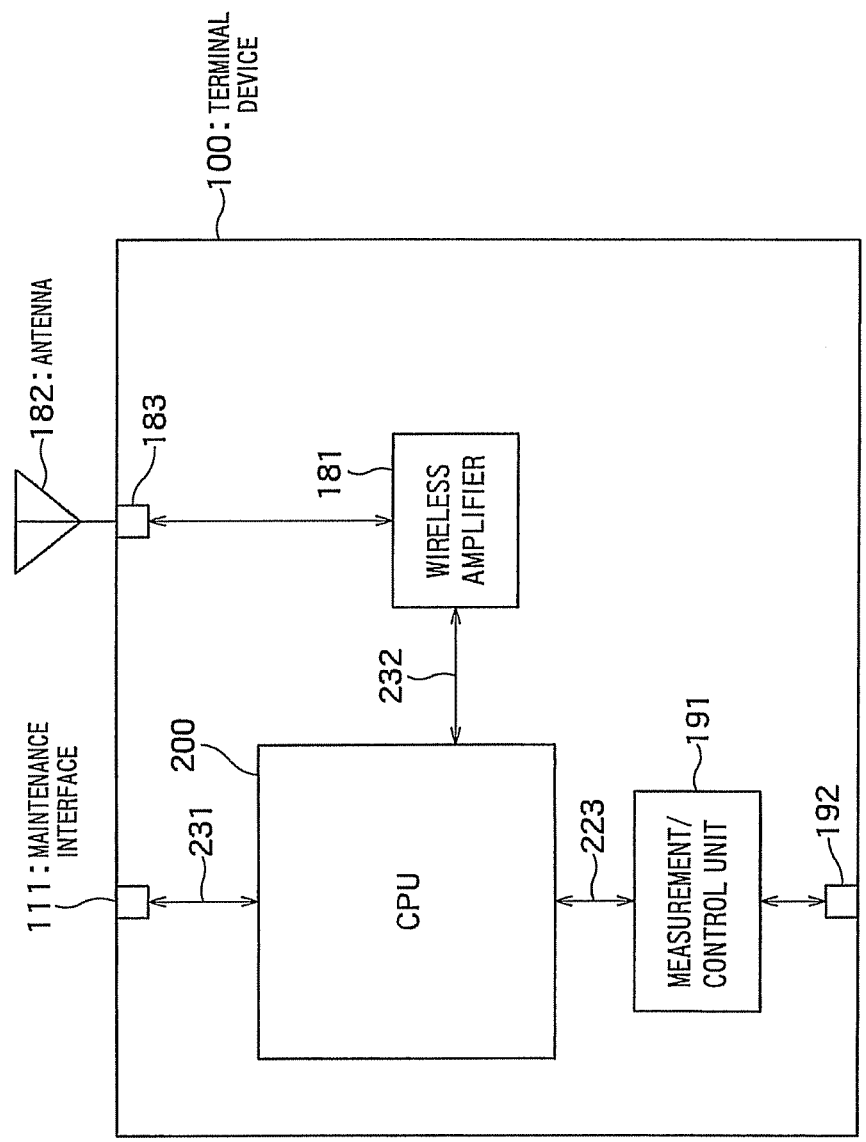
FIG. 2 is a hardware configuration of a terminal device according to the embodiment.

FIG. 2 shows a hardware configuration of the terminal devices 101-1 to 101-3.

A CPU (central processing unit) 200 is connected to a wireless amplifier 181 via a wireless data link 232. The wireless amplifier 181 is connected to an antenna 182 via an external input/output terminal 183. The CPU 200 is connected to a measurement/control unit 191 via a UART (universal asynchronous receiver transmitter) connection 223. The measurement/control unit 191 is connected to an external input/output terminal 192. For instance, the measurement/control unit 191 communicates with an electricity consumption meter via the external input/output terminal 192 to measure the power consumption of devices, and passes the result to the CPU 200. The CPU 200 is connected to an external maintenance interface 111 through a debug interface thereof (see FIG. 3).

Figure 3:
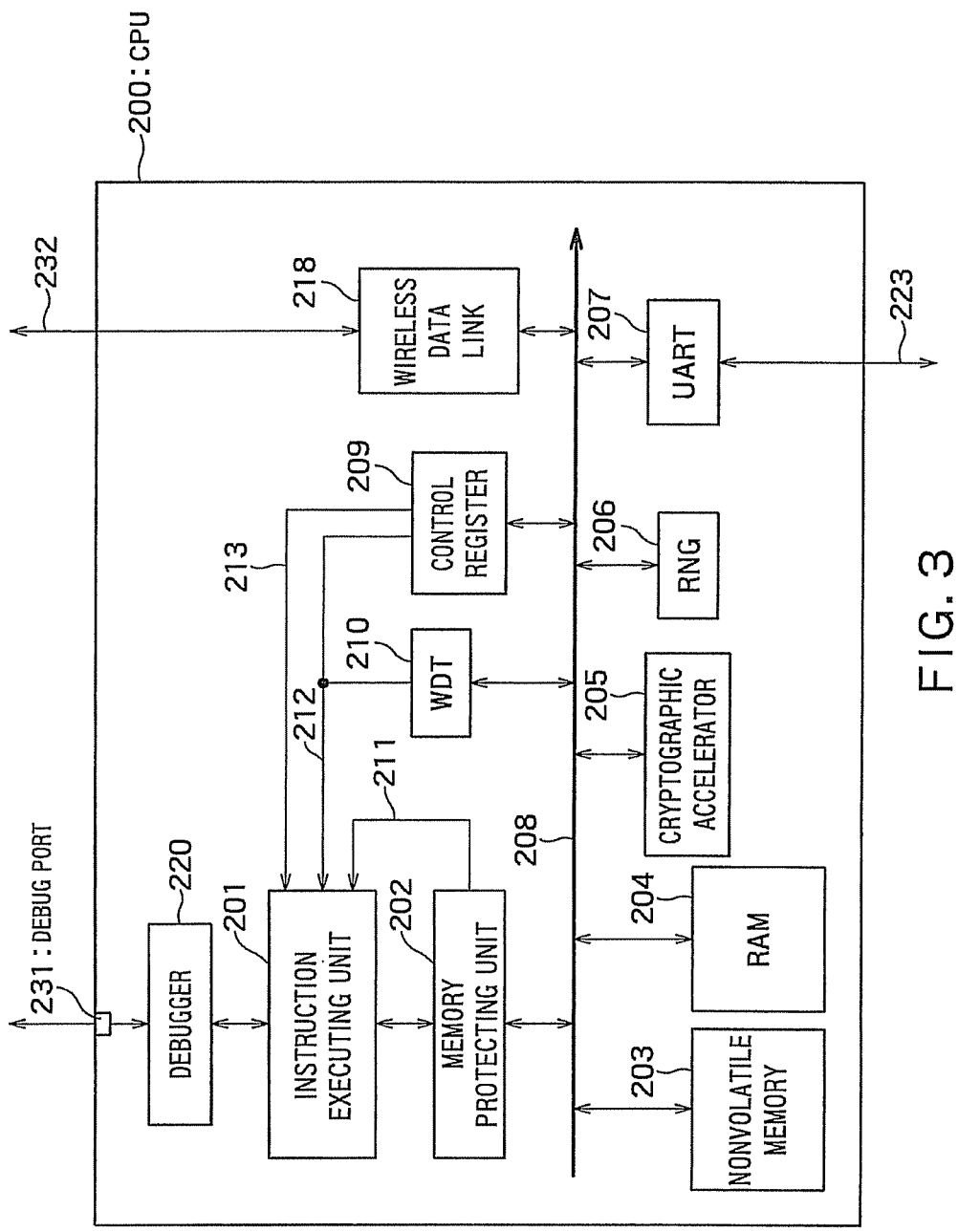
FIG. 3 is a diagram showing an internal configuration of a processor included in the terminal device of the embodiment.

FIG. 3 shows an internal configuration of the CPU 200.

An instruction executing unit (execution unit) 201 is connected to an internal bus 208 via a memory protecting unit 202.

The memory protecting unit 202 outputs a signal indicating whether an instruction to be entered into the instruction executing unit 201 is fetched form the ROM monitor program 301 (see FIG. 4) in a nonvolatile memory 203 or not. The signal is input into the instruction executing unit 201 via a signal line 211.

The nonvolatile memory (flash memory) 203 and a RAM (random access memory) 204 are connected to the internal bus 208.

A watch dog timer (WDT) 210 and a control register 209 are also connected to the internal bus 208. A reset signal, which is an output of the control register 209, and an output (reset signal) of the WDT 210 are input into the instruction executing unit 201 via a reset signal line 212 by wired-or. Another output of the control register 209, which is a NMI (non-maskable interrupt) signal, is input into the instruction executing unit 201 via a NMI signal line 213.

A cryptographic accelerator 205 and a random number generator (RNG) 206 are connected to the internal bus 208 in an analogous manner. A wireless data link 218 and a UART (universal asynchronous receiver transmitter) 207 are also connected to the internal bus 208.

A debugger 220 is connected directly to the instruction executing unit 201, and connected to the outside (the maintenance interface 111 in FIG. 2) via a debug port 231.

Figure 4:
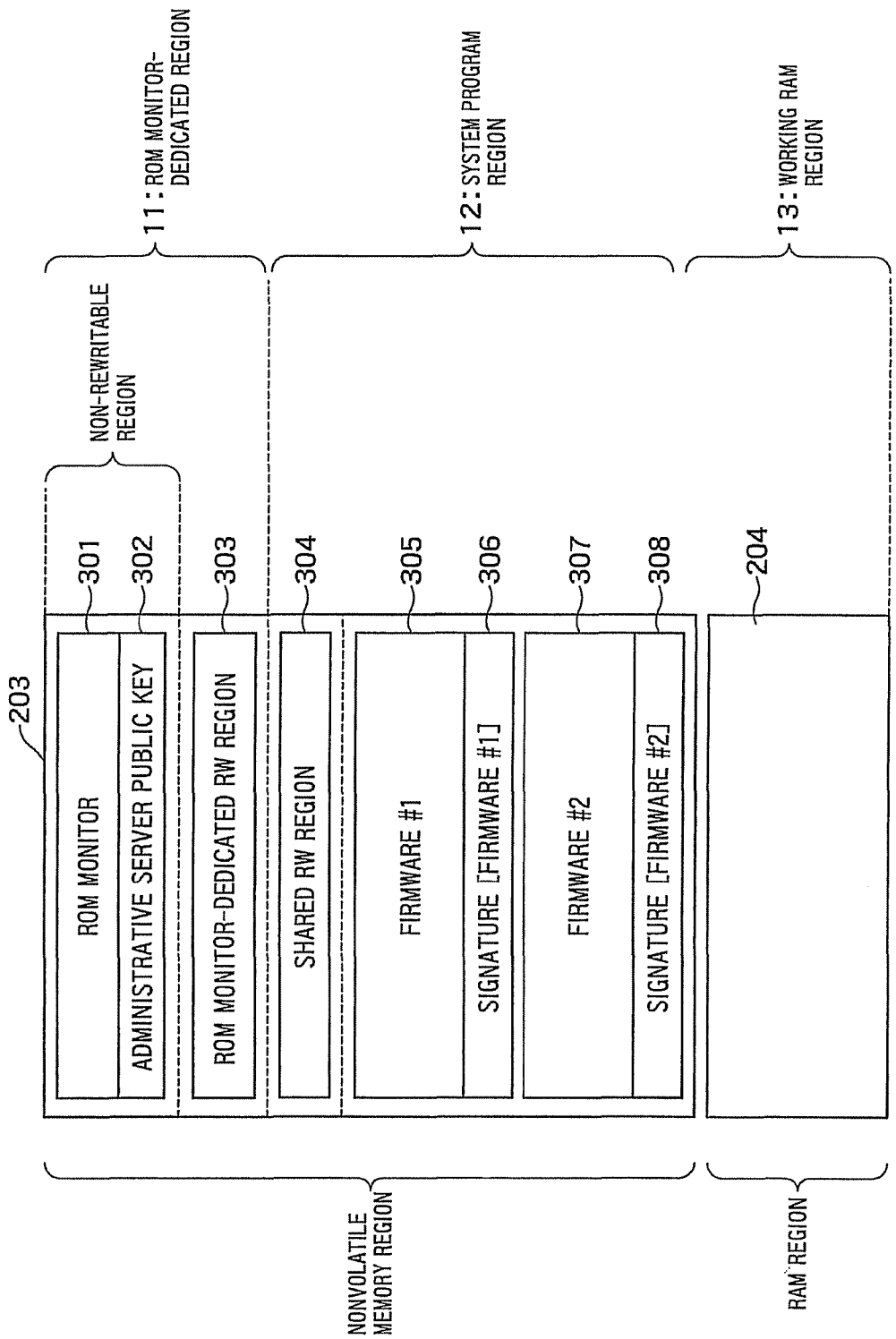
FIG. 4 is a diagram showing a memory map of a nonvolatile memory and RAM according to the embodiment.

FIG. 4 shows a memory map of the nonvolatile memory 203 and the RAM 204.

The nonvolatile memory 203 roughly includes a ROM monitor-dedicated region 11 and a system program region 12.

The ROM monitor-dedicated region 11 includes the ROM monitor program region (monitor program storage) 301, an administrative server public key region 302 and a ROM monitor-dedicated RW region 303. Note that, in this embodiment, the same reference symbol may be assigned to a region of the memory and data stored in this region. For instance, the same reference numeral 301 is assigned to the ROM monitor program and the ROM monitor program region.

The ROM monitor program 301, which may hereinafter be abbreviated as ROM monitor, and the administrative server public key 302 are arranged in a non-rewritable region of the nonvolatile memory.

The ROM monitor-dedicated RW region 303 is arranged in a rewritable region in the nonvolatile memory. However, the ROM monitor-dedicated RW region 303 is accessible only from the ROM monitor 301. Access from programs other than the ROM monitor 301 is prohibited by an after-mentioned access control function.

The system program region 12 includes a shared RW region 304 and the other region.

The shared RW region 304 is accessible from both the ROM monitor 301 and the system program (also referred to as system software or firmware).

As regions other than shared RW region, regions 305 and 306 store firmware (FW) #1 and a signature for the firmware #1. Regions 307 and 308 store firmware #2 and a signature for the firmware #2. The system software has: a first function that includes message transmission and reception to and from the administrative server and system software downloading; and a second function that provides the administrative server or another external server with a predetermined network service.

The RAM 204 includes a working RAM region 13, which is a working region for various processing.

[Access Control]

Access to the ROM monitor-dedicated RW region 303 in the nonvolatile memory 203 and setting of the watch dog timer 210 (timer activation and timer cancellation) are executed only by the ROM monitor 301.

This can be achieved by storing, in the memory protecting unit 202, tag information indicating whether an address range falls into the storage region for the ROM monitor 301 or the other region for each instruction acquired from the memory (nonvolatile memory and RAM) for execution. Furthermore, there are many measures for acquiring an analogous function in a configuration having a cache memory. Any of these can be adopted. Implementation of such access control can be realized at low cost in comparison with the configuration of a monitor processor having a plurality of processors.

The ROM monitor 301 only has two entry points, i.e., reset and non-maskable interrupt (NMI). The ROM monitor 301 cannot be executed from addresses other than the two entry points. That is, the ROM monitor 301 can only be executed on resetting and on non-maskable interruption.

As to the former reset entry point, in the case where the system software executed in addresses other than for the ROM monitor 301 tries to execute the ROM monitor in an execution state of a normal mode, the software issues an instruction for jumping to an address in the ROM monitor 301. The issuance of the jumping instruction causes the memory protecting unit 202 to generate a reset signal. The generated reset signal is input into the instruction executing unit 201 via the signal line 211.

As to the latter NMI entry point, in the case where the program (system software) in the execution state of the normal mode performs writing to the NMI generating register in the control register 209, an NMI signal is generated. The generated NMI signal is input into the instruction executing unit 201 via the signal line 213. This allows the ROM monitor 301 to be executed from the NMI starting address.

These functions pertaining to execution of the ROM monitor 301 are analogous to management of a supervisor bit in an existing processor. However, this embodiment can have both the ROM monitor mode and the supervisor mode.

Here, the control register 209 has a capability of generating both the NMI signal and the reset signal. However, the access control by the memory protecting unit 202 puts a limitation such that only issuance of NMI signal can be used in the modes of the system software and cannot generate the reset signal. Generation of the reset signal is limited to the ROM monitor 301.

Hereinafter, referring to FIGS. 5, 6 and 7, procedures will be described that, in a normal operation, downloads update software from the administrative server 2 to the terminal device and updates the system software of the terminal device by restarting.

Figure 5:
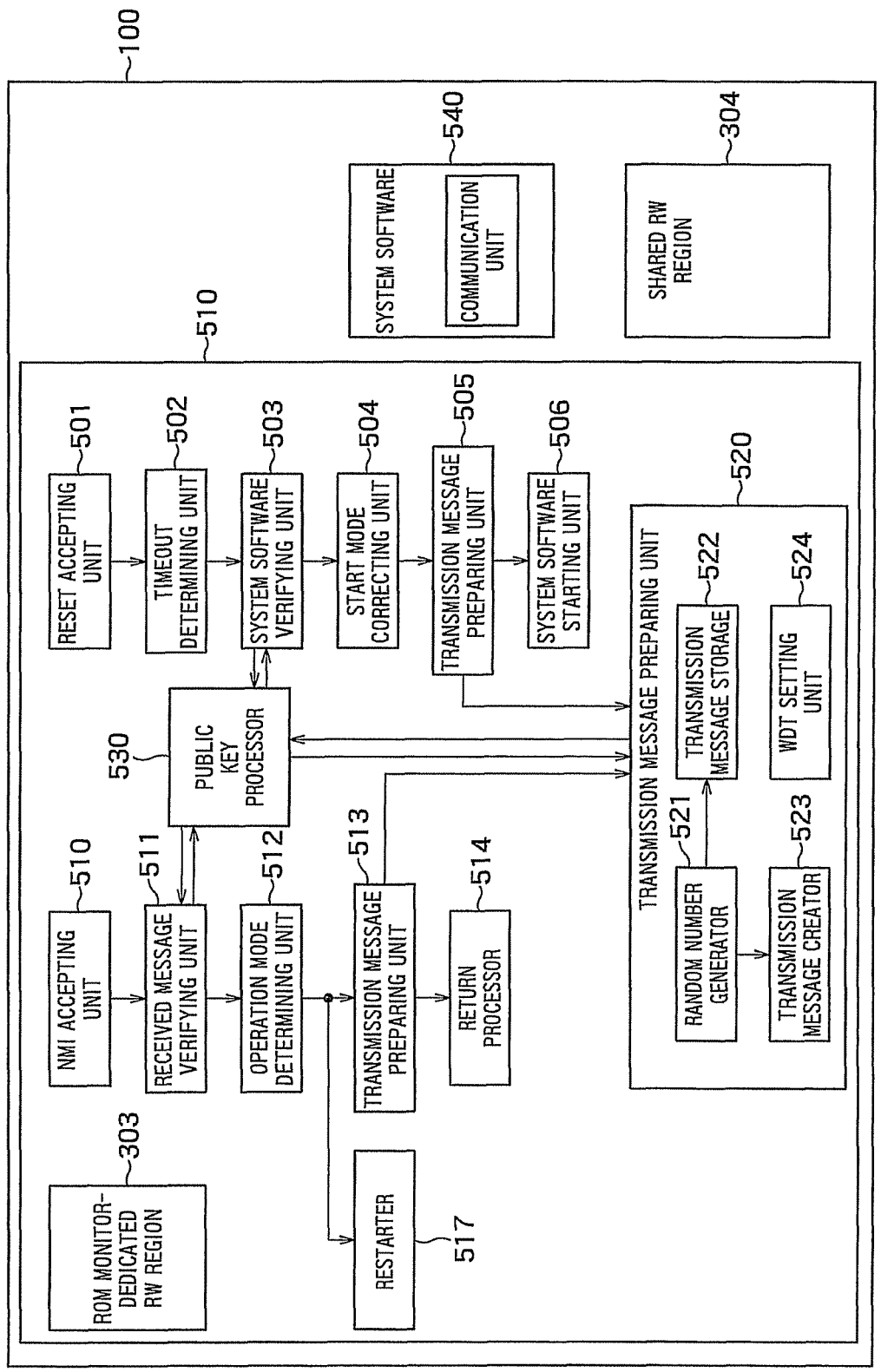
FIG. 5 is a block diagram showing a configuration of the terminal device according to the embodiment.

FIG. 5 is a block diagram showing a functional configuration of the terminal device.

Figure 6:
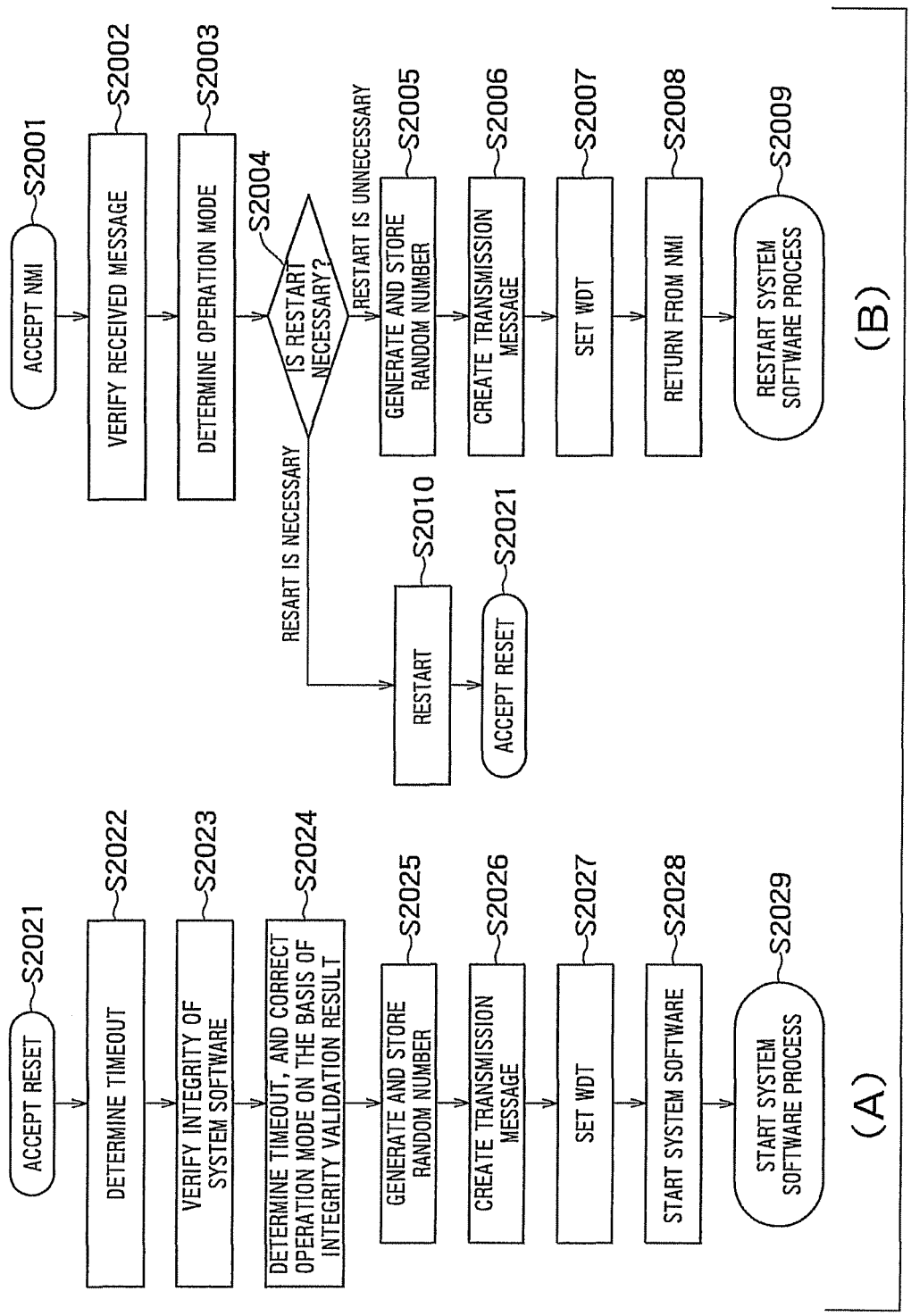
FIG. 6 is a flowchart of an operation of a ROM monitor program according to the embodiment.

FIG. 6 is a schematic flowchart of an operation of a ROM monitor operation.

Figure 7:
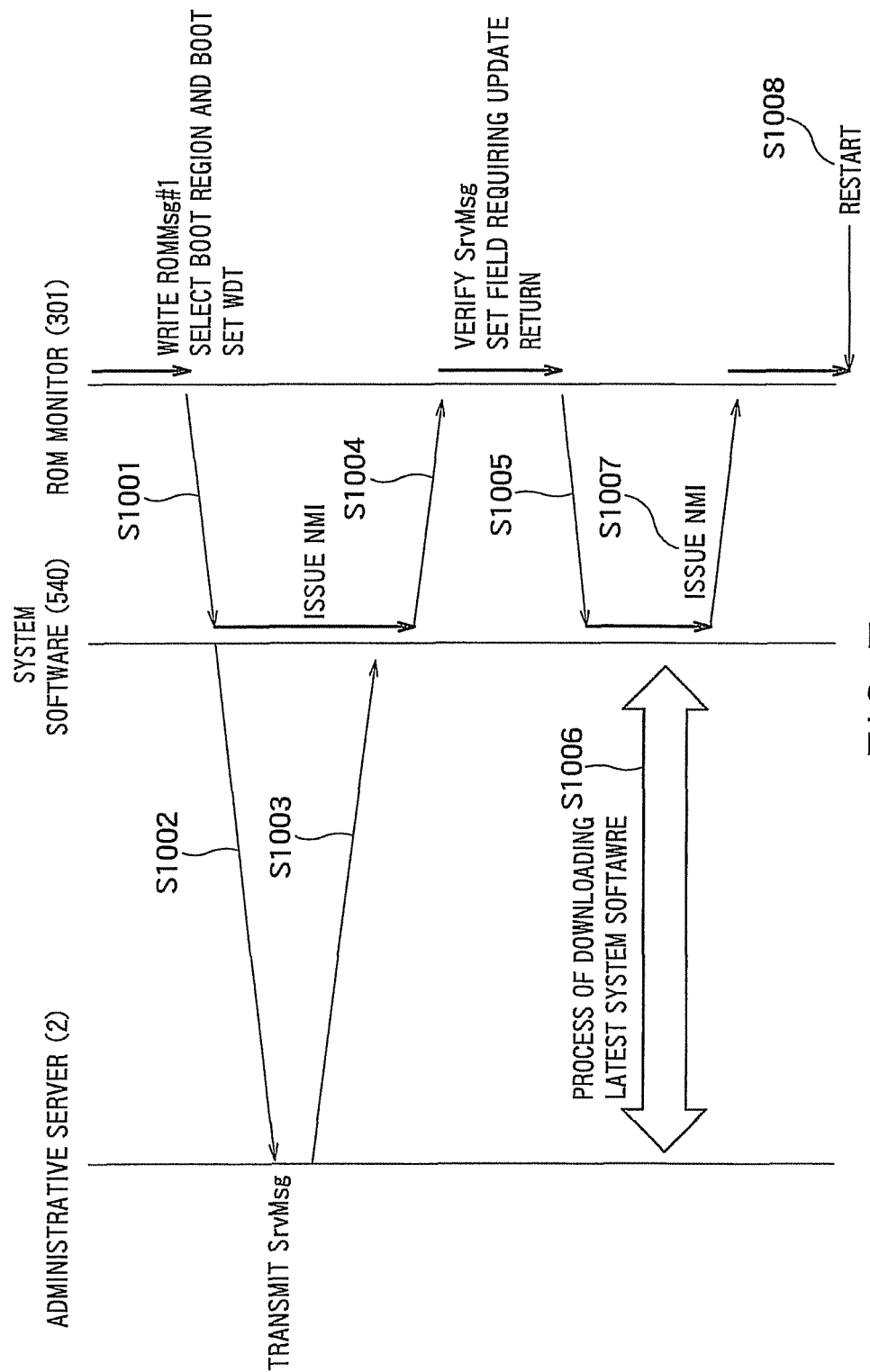
FIG. 7 is a sequence diagram of downloading update system software according to the embodiment.

FIG. 7 is a schematic sequence diagram of downloading update software in the operation of the terminal device.

Power-on or input of a reset signal causes the CPU 200 to execute the ROM monitor 301 from the initial state. (reset accepting unit 501, S2021).

Figure 10:
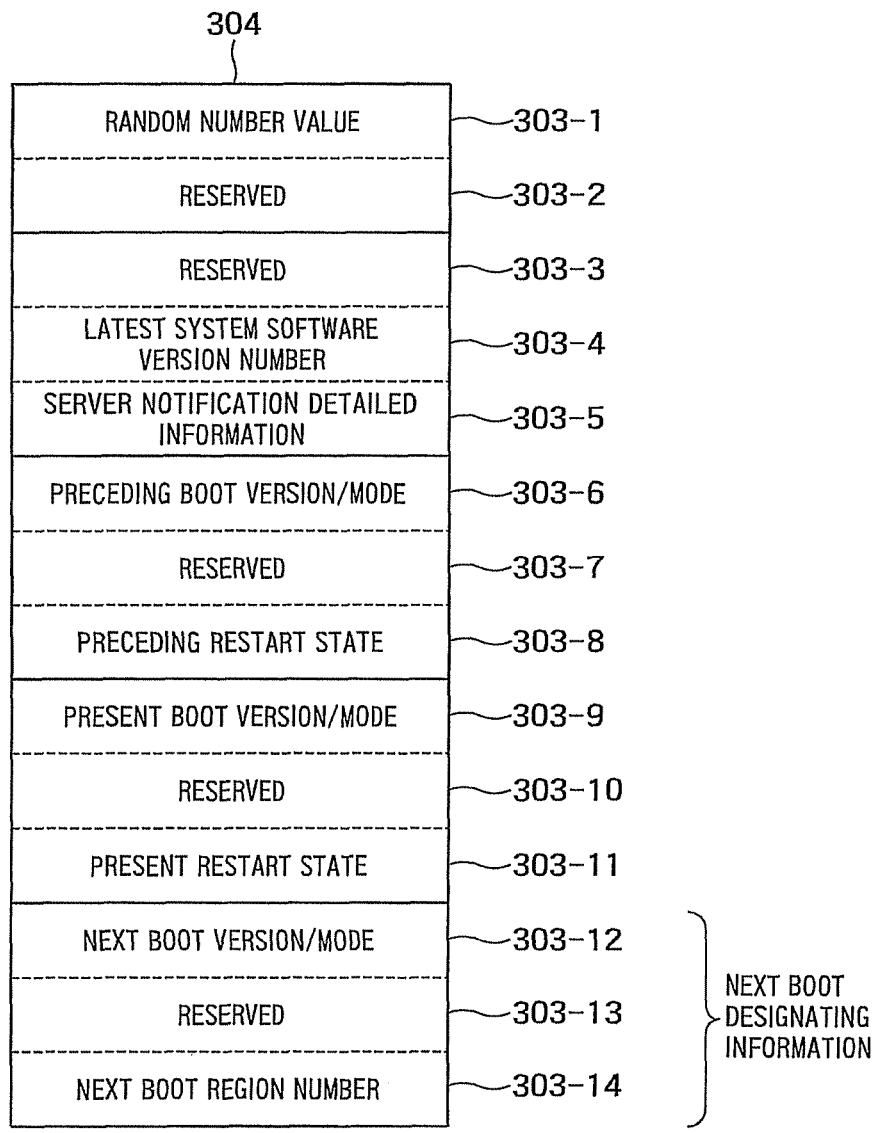
FIG. 10 is a data arrangement diagram of a ROM monitor-dedicated RW region of a nonvolatile memory according to the embodiment.

First, the ROM monitor 301 acquires the states of the WDT 210 and the control register 209, identifies if the cause of the preceding restart is by (1) the timeout of the WDT 210, (2) the operation by ROM monitor 301 on the control register 209 or (3) power termination, and writes the identified cause in the ROM monitor-dedicated RW region 303 (timeout determining unit 502, S2022). More specifically, as shown in FIG. 10, which specifically illustrates the configuration of the ROM monitor-dedicated RW region, the identified cause is written in a present restart state region 303-11 (see FIG. 10).

Next, in initial state execution by reset, the ROM monitor 301 reads the next boot region number 303-14 included in next boot designating information (see FIG. 10) stored in the ROM monitor-dedicated RW region 303. The ROM monitor 301 verifies the system software stored in a region designated by the next boot region number 303-14 using a public key for validation (administrative server public key) 302. A table indicating correspondence between the region numbers and storage destination addresses is separately provided in a ROM monitor-dedicated FW region. Instead of the region number, the storage destination address may be directly stored. This avoids the need of the table. The validation verifies that the server signature is appropriately assigned and that the version number of the system software stored in a system software header X matches with the version number of next boot version number/mode 303-12 (see FIG. 10) included in next boot designating information (see FIG. 10) (system software verifying unit 503, S2023).

If verification of matching fails, the system software stored in another storage site as a next alternative is verified.

For instance, if a mismatch of the version number of the system software stored in the firmware #1 region 305 in FIG. 4 is detected, the system software (system software downloaded at the preceding time) stored in the firmware #2 region 307 as a next alternative is verified. The ROM monitor 301 writes information designating the version number of the next alternative and a fall-back operation mode (second operation mode) in a version number/mode region 303-12 for the next boot, and writes "fall-back" in an start/restart mode designating region 304-1 in the shared RW region (start mode correcting unit 504, S2024).

The fall-back operation mode is for limiting functions (services) that operate for the functions of the system software, and allows only first function (message transmission and reception, and downloading of the system software) of the first and second functions to operate (the details will be described later). The mode allowing both the first function and the second function (network service function) corresponds to normal operation mode (first operation mode) in this embodiment.

The ROM monitor 301 creates a query ROM message (request message) for acquiring presence or absence of the update system software and vulnerability information from the administrative server 2, and writes the created ROM message in the request message region 304-6 (second storage) in the shared RW region 304 and sets the WDT 210 (transmission message preparing unit 505, S2025 to S2027, S1001 in FIG. 7). The detailed configuration of the transmission message preparing unit 505 is represented by a block 520. The transmission message preparing unit 505 includes a random number generator 521, a transmission message creator 523, a transmission message storage (first setting unit and second setting unit) 522, a WDT setting unit (timer starting unit, timer canceling unit) 524.

ROM message creating procedures are as follows.

First, a random number value as a random challenge is created using the random number generator 206. The generated random number value is stored in a random number value region 303-1 (first storage, see FIG. 10) in the ROM monitor-dedicated RW region 303 (random number generator 521, transmission message storage 522, S2025).

Next, the version number of the FW (system software) to be booted and a boot mode are concatenated with the random number value to thereby generate concatenated data. The hash value of the concatenated data is calculated. The entire data including the hash value is encrypted using the server public key 302. If the information is great and cannot be stored in one block of the public key cryptography, hybrid cryptography combining a symmetric key (or a common key) may be adopted. The encrypted result is stored in the region 304-6 (second storage) in the shared RW region 304 (transmission message creator 523, transmission message storage 522, S2026).

A constant expected time T1 in which a message from the administrative server 2 is, returned is set in the WDT 210 (WDT setting unit 524, S2027). The setting of the WDT 210 cannot be canceled from software (program) other than the ROM monitor 301. If the setting of the WDT 210 is not canceled even after the expected time T1 elapses, the WDT 210 issues a reset signal. This resets the terminal device, and the control is taken over by the ROM monitor 301. This provides measures for recovery against system takeover by the malware. An overflow of the WDT 210 (i.e. WDT 210 is not canceled even after the constant expected time T1 elapses) can be determined by the ROM monitor 301 reading a register in the WDT 210.

The ROM monitor 301, having performed the procedures up to here, issues a jumping instruction to a region (or an address) designated by the next boot region number 303-14 (see FIG. 10) (system software starting unit 506, S2028). The issuance of the jumping instruction executes the system software. Instructions to be executed thereafter are prohibited from accessing the ROM monitor-dedicated region 11 and the WDT 210. This protects the internal information of the ROM monitor 301 and monitoring by the WDT 210 against unauthorized operation by malware.

[Process in System Software]

Figure 11:
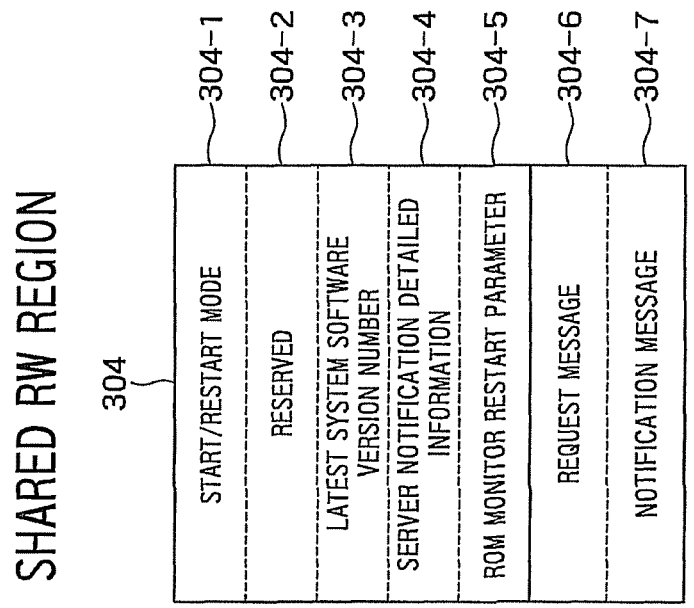
FIG. 11 is a data arrangement diagram of a shared RW region of the nonvolatile memory according to the embodiment.

The system software refers to the start/restart mode 304-1 (see FIG. 11) in the shared RW region 304. Here, the start/restart mode is designated as "normal". Accordingly, the terminal device starts a normal network service. That is, the system software of the terminal device operates in the first operation mode. As an example of a service, which is a network service, there is a service of transmitting power consumption data measured by the measurement/control unit 191 to the administrative server or another device.

Concurrently, the system software transmits the request message (ROM message) 304-6 written by the ROM monitor 301 in the shared RW region 304, to the administrative server 2 (S1002 in FIG. 7). A transmission method may be a method of storing in a UDP message, or a method of transferring a request message as a file. On the assumption of a case of consideration of a network congestion state or the like, appropriate transmission rate control that does not cause unnecessary congestion is performed and, even in, the case where the network state is unstable, it is preferred that the connection procedure be simple for securing message reachability. The system software in a healthy state makes a best effort for transmitting the request message (ROM message) and receiving the notification message from the administrative server 2.

[Message Format]

The format of a message exchanged between the ROM monitor 301 and the administrative server 2 will now be described in detail.

First, cryptographic processes and constants used in the following description are described.

Kp: administrative server public key

Ks: administrative server secret key

Z=EP_Kp[A]: asymmetric encryption (RSA etc.) of data "A" according to the public key "Kp". The output is "Z".

I=V_Kp[Msg, Sig] signature validation according to the public key "Kp" on a message "Msg" and a signature "Sig". It is preferred to use predetermined padding, such as PSS. "I" is a validation result ("1" represents that the validation has succeeded, and "0" represents that the validation has failed.).

Sig=S_Ks[Msg]: the signature is generated on "Msg" according to secret key "Ks".

Y=E_S[X]: symmetric key block encryption of "X" according to the secret key "S". "Y" is calculated. The data sizes of "S", "X" and "Y" match with the block length. In the following example, AES128 is exemplified, and the description is made such that the block length is 128 bits (16 bytes). Instead, another cryptographic algorithm may be adopted.

Y=H[X]: Hash calculation on "X". "Y" is output.

X=D_S[Y]: symmetric key block decryption of X according to the secret key S.

Rnd, Rnd (n): a random number generated in the terminal device. In the case of "Rnd (n)", "n" represents the number of generation.

CVer: the version number of system software that the terminal device presently uses

NVer: the latest version number of system software that the administrative server distributes Act (#CVer): An operation that the terminal device using "#CVer" should take.

Mode: the mode of the systemware that the terminal device presently uses.

A request message (ROM message) "RMsg" of the ROM monitor 301 has the following format.

$$RMsg=E_p\_Kp[Rnd\|\#CVer\|Mode\|H[Rnd]] \quad \text{Equation 1}$$

"RMsg" is written in the region 304-6 in the shared RW region 304 of the terminal device, and transmitted by the system software to the administrative server 2.

The administrative server 2 decrypts the ROM message "RMsg" according to the secret key "Ks" to capture "Rnd‖H [Rnd]". A hash value is calculated on the basis of "Rnd" and a hash function, and it is verified whether the hash value and "H [Rnd]" match with each other. If the matching is verified, the administrative server 2 creates the message main body, $$Ver=\#NVer\|Act(\#CVer).$$

The message main body may further be concatenated with the vulnerability information for the present software version and information on a temporal parameter and the like.

The administrative server 2 creates the notification message (SMsg) on the basis of the message main body according to the following Equations 2 and 3, and transmits the message to the terminal device.

$$Msg=E\_S[Rnd\|Ver\|Hash[Ver]]] \quad \text{Equation 2}$$

$$SMsg=Msg\|S\_Ks[Msg] \quad \text{Equation 3}$$

The ROM monitor 301 (as will be described below, writing by the system software into the control register 209 generates the NMI to allow the ROM monitor 301 to take over the control) invoked by the non-maskable interrupt (NMI) reads the notification message (SMsg) written by the system software into the region 304-7 in the shared RW region 304, and verifies the integrity according to the server public key "Kp".

Next, the notification message (Msg) is decrypted according to the stored random number (Rnd), and the hash value for the message main body (Ver) is calculated. It is verified whether the hash value matches with the hash value (Hash [Ver]) included in the notification message (Msg). Note that the secret key "S" is preliminarily shared between the terminal device and the administrative server.

The aforementioned procedures protect the terminal device against attacks on the network and attacks by the system software infected with malware, in view of the following points.

The message (SMsg) from the server that includes the latest version number #NVer is a response to the preceding ROM message (RMsg) including the random number (Rnd). That is, the message (SMsg) is not a replay of the notification message previously transmitted from the administrative server.

The operation that the terminal device should take is concealed.

There is a fear that the operation that the terminal should take is used for narrowing down the targets to be attacked by the attack terminal 999 (see FIG. 1), such as an unauthorized terminal or an infected terminal. There is a case of requiring concealment.

However, in the case where the control network to which the terminal devices belong includes substantially equivalent terminal devices, the vulnerability information matches among substantially all the terminals. Accordingly, concealment does not function well. In this case, the configuration of notification message from the administrative server 2 is simplified, a format is adopted that only including the random number value and the latest version number as defined by the following Equation 4, and encryption (see the Equation 2) according to the secret key "S" can be unnecessary.

$$Msg'=Rnd\|\#NVer \quad \text{Equation 4}$$

$$SMsg=Msg'\|S\_Ks[Msg'] \quad \text{Equation 5}$$

On notification of the latest version number from the administrative server 2, it is important to eliminate a replay attack. The replay attack can be prevented also by using a concealed channel. However, establishment of the concealed channel typically requires plural times of communication. To avoid vulnerability, the ROM monitor without own communication can perform a communication process only at starting or a service accepting. Accordingly, establishment of the concealed channel takes time.

In contrast, in this embodiment, notification of the latest version (#NVer) from the administrative server 2 that is most important in the system software update is performed by encrypting the random challenge (random number value) generated by the terminal device according to the server secret key. A method that verifies whether the latest version notification replied with the signature of the administrative server message and the random challenge match with those stored by the terminal device or not can eliminate threats of replay by an attacker that does not know the random challenge.

Even in the case where the system software is infected with malware, prohibition of access by the system software to the region 303-1 in the monitor-dedicated RW region 303 that stores the random challenge (random number value) can eliminate a replay attack.

[Process in Administrative Server]

When the administrative server 2 receives the request message (ROM message) 304-6, the server decrypts the request message according to the secret key corresponding to the server public key as described above and verifies the hash value using the random number. If the hash value is correct, the following additional information is mutually concatenated thereto, and the signature is further added to thereby generate a notification message (the detail is as described above). The notification message is returned to the originating system software (terminal device).

Additional Information the latest system software version number
vulnerability information for the present software version
a recommended operation mode and a temporal parameter The system software, having been received a notification message from the administrative server 2 (S1003), writes the notification message in the region 304-7 (third storage) in the shared RW region 304. The system software performs writing in the control register 209 to cause a non-maskable interrupt (NMI), and allows the ROM monitor 301 to take over the control (S1004).

The non-maskable interrupt (NMI) from the system software restarts execution of the ROM monitor 301 (NMI accepting unit in FIG. 5 (interruption accepting unit) 510, S2001 in FIG. 6). The ROM monitor 301 clears the WDT 210, and verifies the signature of the notification message stored in the region 304-7 in the shared RW region 304 according to the administrative server public key 302 (received message verifying unit 511, S2002). If the validation succeeds, the ROM monitor 301 performs the following process on the basis of the contents of the notification message.

That is, the version of the notified latest system software and the version of the system software presently under execution are compared with each other.

If both are different, the latest system software version number is written as a parameter in the region 304-3 in the shared RW region 304 (operation mode determining unit 512, S2003), and "software download" as the start/restart mode, which is an update download instruction, is written in the region 304-1 (fourth storage) (S1005 in FIG. 7).

On the other hand, when both match with each other, the start/restart mode 304-1 is let to be "normal".

Subsequently, the ROM monitor 301 prepares the transmission message and sets the WDT (transmission message preparing unit 513, S2005 to S2007). The configuration of the transmission message preparing unit 513 is the same as that of the transmission message preparing unit 505. The detailed configuration is shown in the block 520. The ROM monitor 301 returns from the non-maskable interrupt (NMI) to the system software (return processor 514, S2008).

The system software verifies that the restart mode 304-1 is "software download", performs an interruption completing process, and restarts the own execution.

The system software verifies the start/restart mode region 304-1 in the shared RW region 304, and, because the start/restart mode is "software download", downloads the update software from the administrative server or another device (another terminal device having already downloaded the update software) (S1006 in FIG. 7), while continuing the normal service. The system software writes the downloaded update software in an available region in the system program region 12 (see FIG. 4). The version number, the storage region number (or address) and the like are further written in the shared RW region 304-2. After completion of the download, "download completed" is written as a ROM monitor restart parameter in the region 304-5 in the shared RW region 304. Subsequently, the non-maskable interrupt (NMI) is issued again (S1007), and the control is taken over by the ROM monitor 301 (S2001).

When the ROM monitor 301 verifies the "download completed" in the ROM monitor restart parameter 304-5, the monitor verifies the integrity of the update software by signature validation on the administrative server public key 302 (S2002). The monitor further verifies that the version number of the update software matches with the latest version included in the notification message from the administrative server 2. If the ROM monitor 301 monitor verifies the matching, the monitor sets the next start/restart mode 304-1 in the shared RW region 304 to the "normal" (operation mode determining unit 512, S2003). Furthermore, according to the update software, the next boot designating information (303-12, 303-13 and 303-14) in FIG. 10 is updated on the basis of the information (the version number, storage region, etc.) stored in the reserved region 304-2 in the shared RW region.

Subsequently, the ROM monitor 301 generates the reset signal using the control register 209 to thereby perform restart process (restarter 517, S2010, S2021, S1008). That is, the CPU reset terminates the ROM monitor 301 and the system software and newly restarts the ROM monitor 301 (the entire RAM is erased as necessary).

Subsequently, processes after the restart by the ROM monitor 301 are as described above. If the download has been normally completed, validation of the system software succeeds also in the reboot process. The ROM monitor 301 performs the series of processes, and allows the system software to take over the control, thereby starting the system software.

The software update sequence in the normal state is for the state where both the system software operating in the terminal device and the control network 1 are healthy.

Hereinafter, an example will be described where, from a state in which malware intrudes the control network 1 and a part or most of the terminal devices are infected by the malware, combined autonomous operations of acquiring the update software and function fall back by the ROM monitor of the terminal device limits adverse effects exerted by the malware on the network state and allows the update software to be early acquired.

[Unauthorized Acquisition of Control Capability by Malware and Obstruction to Distribution of Software Update Notification by Malware]

Fundamental measures against malware are to distribute the system software whose vulnerability to be a source of an intrusion by malware is overcome by update and execute the software. However, in the state where the malware has taken over the control capability of the terminal device, threats are assumed that, even if the administrative server 2 distributes the updated system software, the terminal device taken over by the malware cannot receive the software.

In the terminal device of this embodiment, reception of the notification message from the administrative server 2 and timeout of the WDT 210 are combined. This forcedly returns the control to the ROM monitor 301 from the state where the malware has taken over the system software, thereby forcing the monitor to download the update software.

Figure 8:
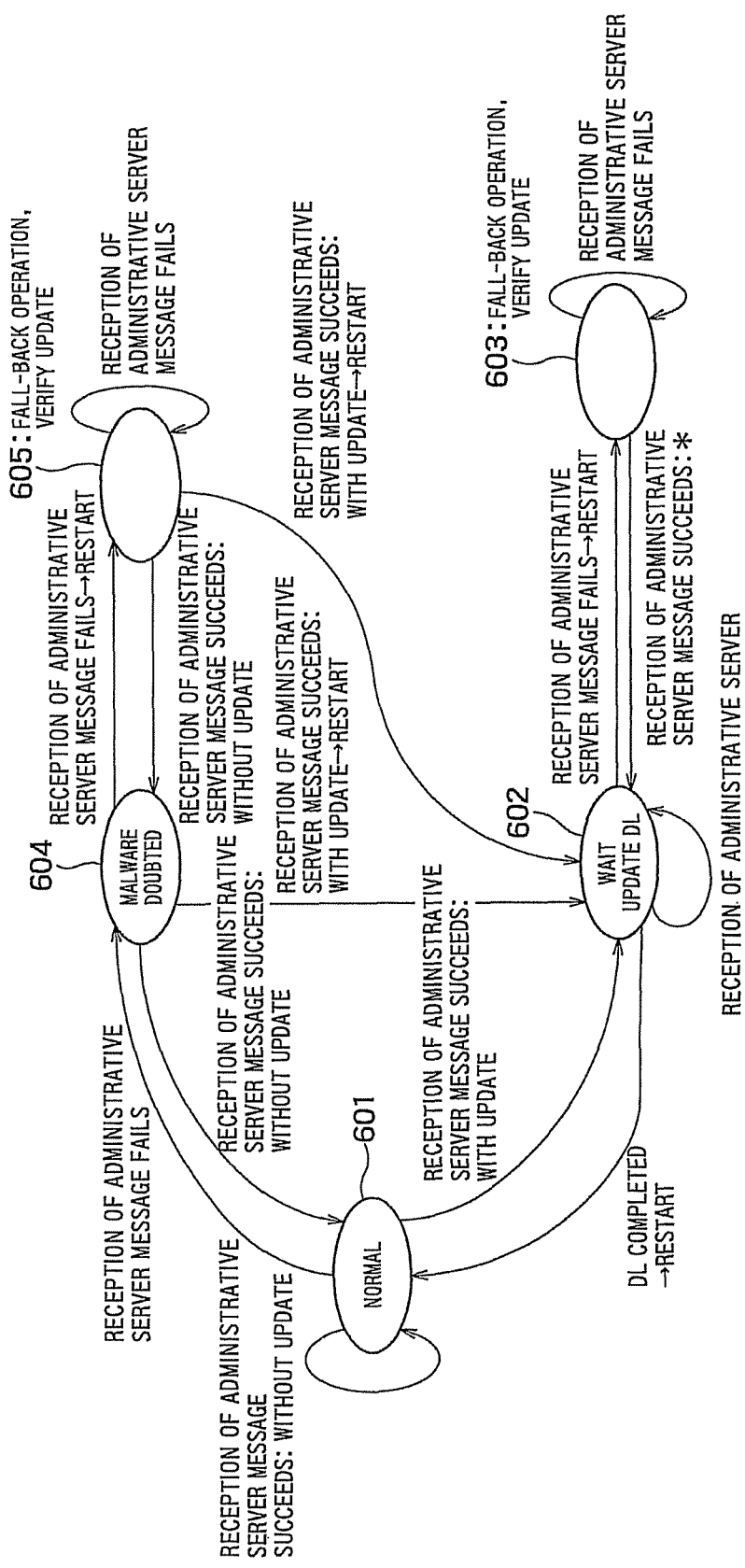
FIG. 8 is a state transition diagram of an operation mode of the terminal device according to the embodiment.

Hereinafter, referring to FIGS. 9 and 8, this example is described in detail.

Figure 9:
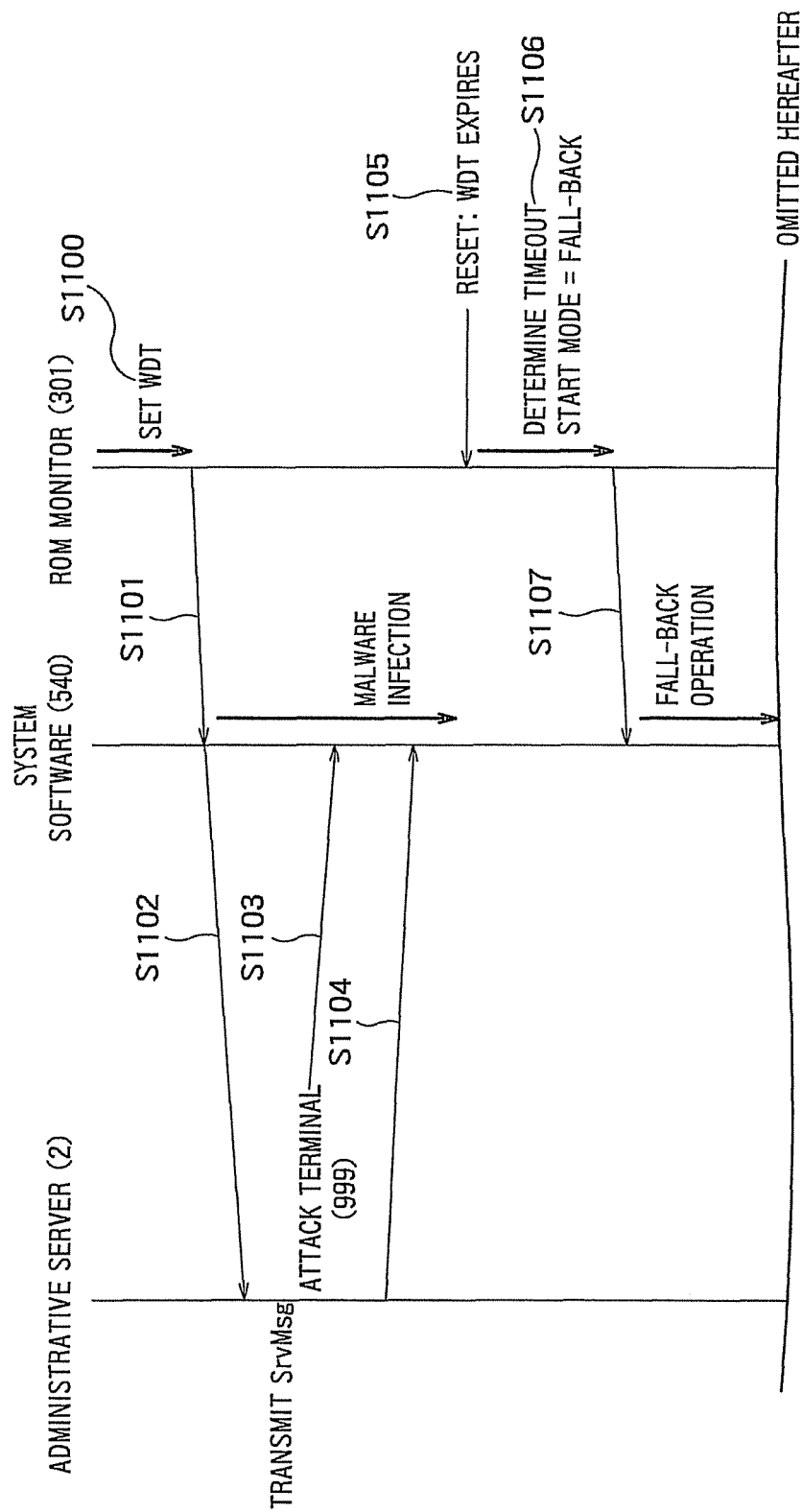
FIG. 9 is a sequence diagram of detecting a malware sign according to the embodiment.

FIG. 9 is a sequence diagram of detecting malware. FIG. 8 is a state transition diagram of the system software starting mode determined by the ROM monitor 301.

In FIG. 9, the ROM monitor 301 resets the WDT 210 on starting, as described above (S1100), writes the request message in the region 304-6 (second storage region) in the shared RW region (shared memory) 304, and allows the system software to take over the control (S1101).

The system software transmits the request message to the administrative server 2 (S1102). The administrative server 2 transmits the notification message (S1104). However, it is provided that, before the terminal device receives the notification message, malware that attacks vulnerability of the system software is transmitted from the unauthorized terminal 999 (see FIG. 1) (S1103) and the system software is infected with the malware.

The malware appropriately receives a notification message instructing application of the update software such that the infection is not detected by the administrative server 2, and downloads the update software (not shown). However, the malware deletes the data of the update software whose vulnerability has been corrected, and does not apply the update software by restarting (not shown). In such situations, the administrative server 2 cannot perform any direct operation, and cannot even detect the sign.

In this embodiment, in the case where the system software that received the notification message does not return the control to the ROM monitor 301 in the period T1 set in the WDT 210, the control is forcedly taken over by the ROM monitor 301 (S1105). In the cases of detecting the sign of intrusion by the malware, such as the case of detecting occurrence of timeout (S1106), and the case where the correct notification message by the administrative server 2 to the challenge random number of the ROM monitor 301 is not written in the region 304-7 in the shared RW region (shared memory) 304 (reference numeral 604 in FIG. 8), the system software is restarted (see the restarter 517 in FIG. 5, S2010 in FIG. 6). That is, the CPU reset once terminates the ROM monitor and the system software, starts the ROM monitor, and newly starts the system software from the ROM monitor according to the above procedures.

Furthermore, in the case where the signs of intrusion are successively detected, the system software starting mode is set to the fall-back operation mode (reference numeral 605 in FIG. 8, S1107 in FIG. 9) to limit the functions and connection destinations of the system software to a minimum function only allowing transmission and reception of messages to and from the administrative server 2 and avoid malware infection, and, in this state, tries communication recovery with the administrative server 2. More specifically, in the case where the system software of the latest version has been infected with malware to perform an abnormal operation but the image of the system software of the latest version on the nonvolatile memory has not been rewritten (validation succeeds), the system software of the latest version is executed in the fall-back operation mode (second operation mode). In the case where the system software of the latest version on the device has been infected with the malware and the image on the system software on the nonvolatile memory has been modified (validation has failed), the device is restarted in the fall-back operation mode (second operation mode) of the system software of the version of the preceding time.

In the case where the notification message cannot be acquired from the administrative server 2 in a constant time, or the case where the notification message has an error, the following causes can be considered.
(1) cancellation of processes of transmitting and receiving the request message and the notification message due to malware infection to the system software
(2) counterfeit of the notification message on the network or due to malware infection to the system software
(3) malfunction of the system software or delay in response due to overload
(4) congestion of the network or the administrative server In the cases (1) and (2), update and restart of the system software are required to recover from malware infection and to prevent reinfection. In the case where the updated system software has not been downloaded yet, it is required that the present system software is operated in the fall-back operation (reference numerals 603 and 605 in FIG. 8) to acquire the updated version and, acquires the updated version and restarts. Even in the case where the updated version has not been prepared yet, and fall-back operation is continued by the time when the updated system software is prepared in view of preventing malware infection and preventing infection from spreading, continues to periodically issue a query on a situation of providing the updated version by the time, and the ROM monitor 301 operates in conformity thereto. In the case where the malware on the network counterfeits the notification message, the own device should not be infected with the malware. However, this determination cannot be made only by the ROM monitor 301. However, the fact of the counterfeit of the message indicates that a certain unauthorized system exists on the network. This indicates a high possibility that the system is another terminal device infected with the malware. The prevention of infection by the own device entering into the fall-back operation mode (reference numerals 603 and 605 in FIG. 8) is an operation for safety.

The ROM monitor 301 has a size smaller than the system software and has no communication function. The operation of the ROM monitor 301 is limited to that on a fixed form data. Accordingly, it is expected that the entire vulnerability can be eliminated by applying a vulnerability detecting method, such as a static validation technique on a source code.

In the case (3), the cause is not malware infection. However, the malfunction of the system software should be corrected immediately. Entering into the fall-back operation (reference numerals 603 and 605 in FIG. 8) for updating the system software is a reasonable operation. If the malfunction is temporary, successful reception of the notification message from the administrative server 2 returns the operation state to the normal mode (reference numeral 601 in FIG. 8).

In the case (4), in a temporary malfunction of the network 1 or the administrative server 2, recovery can be expected. Likewise, if the malfunction is temporary, successful reception of the notification message from the administrative server 2 returns the operation state from the fall-back operation (reference numerals 603 and 605 in FIG. 8) to the normal (reference numeral 601 in FIG. 8).

In this embodiment, for the sake of early correction of the software vulnerability, the ROM monitor 301 integrates the process of acquiring the notification message from the administrative server 2, verification of healthiness of communication between the ROM monitor 301 and the administrative server 2, and a restart process that is a recovery process from malware infection. This allows detecting the sign of malware infection without a heavy load process, such as pattern matching, and enables the update software to be securely executed for preventing infection and for recovery to the normal mode even with obstruction by malware. That is, as characteristics of autonomous recovery, usage of communication with administrative server 2 for verifying whether the sign of the malware infection is detected and update is made or not allows the updated system software to be applied in a constant period to malware including detour measures, such as obstruction to reception of the update notification, without the need of a heavy load malware detection on the terminal device (e.g. a pattern matching process on memory).

The detection of a malware infection sign in this embodiment cannot detect malware types. In consideration of measures against malware that attacks unknown vulnerability, in view of operation of the entire network, it is preferred that a detection unit capable of identifying malware types be used together. It is expected to efficiently detect malware by installing a terminal that is referred to as a honey pot and dedicated to detecting intrusion as a part of the terminals to operate a malware detecting process. Accordingly, the process of detecting malware at each terminal device is eliminated, and measures against malware are taken by vulnerability notification through communication with the administrative server 2, which can reduce the capability required to the terminal device to thereby lower the cost. In the control network, many terminal devices having substantially same configuration operate. Accordingly, advanced search, such as pattern matching, is not necessarily performed by each terminal device. Thus, according to this embodiment, on the basis of the single microcomputer having the simple watch dog timer circuit, the nonvolatile memory and the access control function, a terminal device capable of autonomous recovery from large-scale malware infection can be realized at low cost.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A control device communicating with an administrative server by using system software including a first function and a second function, the first function performing message transmission and reception to and from the administrative server and the second function providing a network service different from the message transmission and reception for an external device, the external device being identical to or different from the administrative server, comprising:
a monitor program storage configured to store a monitor program inaccessible from the system software;
an execution unit configured to read and execute the monitor program;
a first storage configured to be accessible from the monitor program but inaccessible from the system software;
a second storage configured to be writable from the monitor program and readable from the system software;
a third storage configured to be readable from the monitor program and writable from the system software;
a timer configured to be capable of being set by the monitor program and incapable of being set by the system software;
a random number generating unit configured to generate a random number;
a first setting unit configured to set the random number generated by the random number generating unit in the first storage, by the monitor program being executed;
a message creating unit configured to encrypt the random number in the first storage using a public key of the administrative server and to create a request message that is to be transmitted to the administrative server, by the monitor program being executed;
a second setting unit configured to set the request message in the second storage, by the monitor program being executed;
a timer starting unit configured to designate a time and to start the timer, by the monitor program being executed;
a system software starting unit configured to start the system software in a first operation mode in which both the first function and the second function can be executed, by the monitor program being executed, the system software being configured to read the request message from the second storage and send the request message to the administrative server based on the first function;
an interruption accepting unit configured to accept an interruption, from the system software being executed which received a notification message that is a response to the request message from the administrative server, to the monitor program;
a timer canceling unit configured to cancel the timer, by the monitor program being executed in response to the interruption;
a message verifying unit configured to read the notification message from the third storage into which the notification message has been written by the system software being executed, a notification message that is a response to the request message from the administrative server, and to verify the notification message on the basis of the public key and the random number in the first storage, by the monitor program being executed in response to the interruption; and
a restart unit configured to restart the system software in a second operation mode capable in which the first function can be executed but the second function cannot be executed, by the monitor program being executed, in a case where the timer expires before cancellation by the timer canceling unit, or in a case where verification by the message verifying unit fails.

2. The device according to claim 1, further comprising:
a fourth storage configured to be accessible from both the monitor program and the system software;
a unit configured to set an update download instruction for the system software, in the fourth storage, by the monitor program being executed, in a case where the notification message successfully verified includes information that updated system software exists in the administrative server; and
a returning unit configured to return to the system software after the update download instruction is set, by the monitor program being executed;
wherein the first function includes a function of downloading the updated software.

3. The device according to claim 2,
wherein the interruption accepting unit accepts an interruption to the monitor program from the system software having returned by the returning unit, and
the restart unit restarts the updated software downloaded by the system software in the first operation mode, by the monitor program being executed in response to the interruption.

4. The device according to claim 3,
wherein a signature of the administrative server has been added to the downloaded system software,
the device further comprises a system software verifying unit configured to verify the signature on the basis of the public key, by the monitor program being executed, and
the restart unit restarts the updated system software after the signature is successfully verified by the system software verifying unit.

5. The device according to claim 1,
wherein the interruption accepting unit accepts an interruption from the system software having started in the second operation mode,
the message creating unit creates the request message in response to the interruption,
the second setting unit sets the request message in the second storage,
the timer starting unit starts the timer after the request message is stored, the returning unit returns to the system software after the timer is started, the interruption accepting unit accepts an interruption from the system software having returned, the timer canceling unit cancels the timer in response to the interruption from the system software having returned, the message verifying unit verifies the notification message after the timer is canceled by the timer canceling unit, and the restart unit restarts the system software in the first operation mode, in a case where the notification message is successfully verified.

6. The device according to claim 1, wherein the notification message includes a signature and a random number, and the message verifying unit determines that the verification of the notification message succeeds, in a case where the signature is successfully verified on the basis of the public key, and the random number included in the notification message matches with the random number in the first storage.

7. A non-transitory computer readable medium storing a monitor program to communicate with an administrative server by using system software including a first function and a second function, the first function performing message transmission and reception to and from the administrative server and the second function providing a network service different from the message transmission and reception for an external device, the external device being identical to or different from the administrative server, the monitor program, when executed by a computer, causing a computer to execute steps comprising:

setting a random number generated by a random number generating unit in a first storage which is inaccessible from the system software;

encrypting the random number in the first storage using a public key of the administrative server and to create a request message;

setting the request message in a second storage which is readable from the system software;

designating a time and to start the timer, the time being incapable of being set by the system software;

starting the system software in a first operation mode in which both the first function and the second function can be executed, the system software being configured to read the request message from the second storage and send the request message to the administrative server based on the first function;

cancelling the timer in response to an interruption from the system software being executed which received a notification message that is a response to the request message from the administrative server;

reading the notification message from a third storage into which the notification message has been written by the system software being executed, and verifying the notification message on the basis of the public key and the random number in the first storage; and restarting the system software in a second operation mode capable in which the first function can be executed but the second function cannot be executed, in a case where the timer expires before cancellation, or in a case where verification to the notification message fails.

8. The medium according to claim 7, the steps further comprising:

setting an update download instruction for the system software, in a fourth storage which is accessible from the system software, in a case where the notification message successfully verified includes information that updated system software exists in the administrative server; and returning to the system software after the update download instruction is set.

9. The medium according to claim 8, the steps comprising:

accepting an interruption from the system software having returned, and restarting the updated software downloaded by the system software in the first operation mode.

10. The medium according to claim 9, wherein a signature of the administrative server has been added to the downloaded system software, the steps further comprises verifying the signature on the basis of the public key and the updated system software is restarted after the signature is successfully verified.

11. The medium according to claim 7, wherein the notification message includes a signature and a random number, and it is determined that the verification of the notification message succeeds, in a case where the signature is successfully verified on the basis of the public key, and the random number included in the notification message matches with the random number in the first storage.

12. The medium according to claim 7, the steps comprising:

accepting an interruption from the system software having started in the second operation mode, creating the request message in response to the interruption, setting the request message in the second storage, starting the timer after the request message is stored, returning to the system software after the timer is started, accepting an interruption from the system software having returned, cancelling the timer in response to the interruption from the system software having returned, verifying the notification message after the timer is canceled, and restarting the system software in the first operation mode, in a case where the notification message is successfully verified.

* * * * *